United States Patent [19]

Connor et al.

[11] Patent Number: 4,532,455
[45] Date of Patent: Jul. 30, 1985

[54] TUNGSTEN HALOGEN INCANDESCENT LAMPS CONTAINING MIXED HALOGENS

[75] Inventors: Ian Connor; Paul V. Crawshaw, both of Leicester, England

[73] Assignee: Thorn EMI plc, London, England

[21] Appl. No.: 390,792

[22] Filed: Jun. 21, 1982

[30] Foreign Application Priority Data

Jun. 23, 1981 [GB] United Kingdom ............... 8119368

[51] Int. Cl.³ ............................................... H01K 1/50
[52] U.S. Cl. ...................................... 313/579; 313/637
[58] Field of Search ............... 313/579, 578, 637, 643

[56] References Cited

U.S. PATENT DOCUMENTS

| 3,738,729 | 6/1973 | Coxon et al. | 313/579 |
| 3,898,500 | 8/1975 | Johnston et al. | 313/579 |
| 3,919,578 | 11/1975 | Coaton et al. | 313/579 |
| 3,930,178 | 12/1975 | Coaton | 313/578 X |

Primary Examiner—David K. Moore
Assistant Examiner—K. Wieder
Attorney, Agent, or Firm—Fleit, Jacobson, Cohn & Price

[57] ABSTRACT

The invention provides a tungsten halogen linear incandescent lamp having a gas fill comprising a mixture of $CHI_3$ and $(PNBr_2)_3$. Gas fills according to the invention comprise from 6 to 32 micrograms of $(PNBr_2)_3$ per c.c. of the lamp internal volume with a ratio of $CHI_3$ to $(PNBr_2)_3$ of from 1:1 to 5:1 and result in lamps having a increased efficacy and a life of more than 2,000 hours.

5 Claims, 3 Drawing Figures

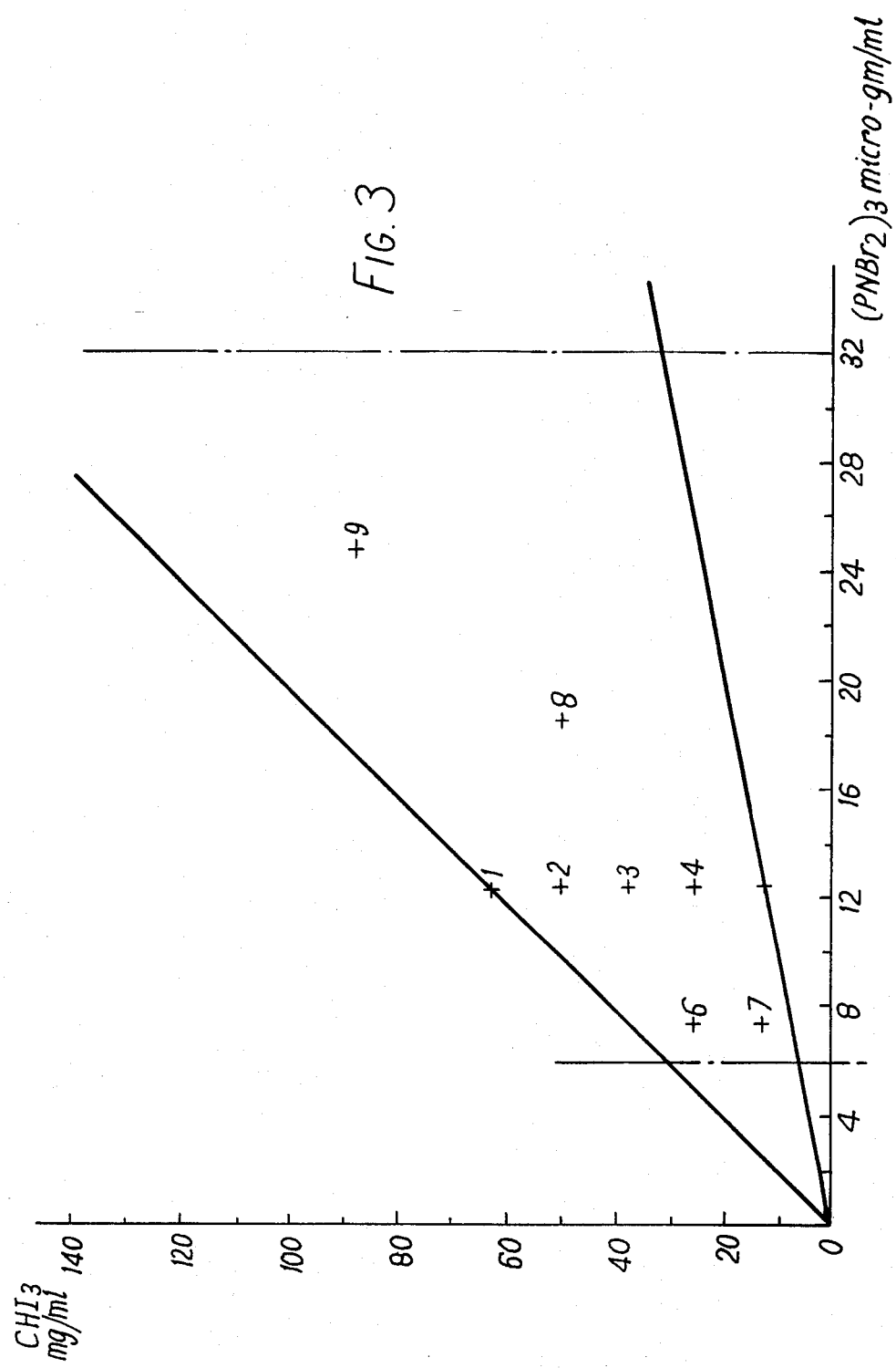

TUNGSTEN HALOGEN INCANDESCENT LAMPS CONTAINING MIXED HALOGENS

This invention relates to tungsten halogen cycle electric incandescent lamps. These lamps employ a tungsten filament in a transparent envelope, usually of fused silica, or quartz, polycrystalline alumina or hard glass and a fill of non-reactive gas or gases such as $N_2$, A, Kr or Xe together with a small quantity of halogen. Bromine, chlorine, fluorine and their compounds have been used as the halogen transport gas but owing to their reactivity are only suitable for high efficacy lamps of short life. For lamps with an intended life of 1000 hours or above, it is generally believed that iodine or an iodine compound is necessary, however, this raises problems since it is difficult to introduce elementary iodine into a lamp. On the other hand the vapour pressure is too low for this iodine to be flushed in at room temperature with a fill gas such as argon. These particular problems were overcome by the method of dosing disclosed in U.S. Pat. No. 3,738,729 wherein iodine is introduced into the lamp in the form of a solution of an iodide or hydroiodide of an element of Group IVB of the periodic table or, preferably a solution of Iodoform ($CHI_3$). Other problems experienced during the use of these lamps emanate from the relatively high temperature of operation.

Under these conditions impurities can be released which interfere with efficient working and it is difficult to introduce a getter for impurities which will be active after lamp processing but not interfere with the regenerative cycle. According to U.S. Pat. No. 3,898,500 this particular problem was solved by introducing the halogen as bromophosphonitrile $(PNBr_2)_3$ which remains inert during lamp processing but releases a predetermined quantity of halogen and provides a gettering action upon thermal dissociation. Whereas $CHI_3$ on its own has been used successfully in long life linear lamps (rated life 2000 hours) it would be desirable to increase the efficacy of the lamps produced. Although $(PNBr_2)_3$ has been used successfully on its own, because of the activity of the bromine cycle it is difficult to achieve control beyond a life of 1000 hours.

An object of this invention, therefore is to produce a tungsten halogen linear incandescent lamp using mixtures of iodoform and bromophosphonitrile effective to achieve an improved efficacy and desirably a life of at least 2000 hours. Quite surprisingly therefore it has now been found that a suitable mixture of $CHI_3$ and $(PNBr_2)_3$ not only gives lamps with an increased efficacy but these lamps ca have lives of over 2000 hours.

Accordingly we provide a tungsten halogen cycle electric incandescent lamp comprising an envelope of light transmitting refractory material, a filament within said envelope, means supporting the filament within the envelope and electric leads to the filament, said lamp further including a non-reactive gas filling together with a further fill comprising a mixture of bromophosphonitrile and iodoform wherein said further fill comprises from 6 to 32 micrograms of bromophosphonitrile per cc of the internal volume of the lamp envelope and wherein the ratio of the iodoform to the bromophosphonitrile is from 1:1 to 5:1 by weight.

We have found that if less than 6 micrograms per cc of bromophosphonitrile is used no effective halogen cycle can be maintained whereas if more than 32 micrograms of bromophosphonitrile is used it is difficult to obtain the required life of 2000 hours.

A particularly suitable quantity was found to be 12.5 micrograms of bromophosphonitrile per c.c. with a preferred ratio 2:1. This was found to offer the best balance of lamp requirements wherein the cycle was well controlled thus giving the required life whilst the iodine level was sufficiently low to minimise absorption effects and thus increase efficacy. Although these optimum results were achieved using a typical test lamp of 240 V 1000 W linear filament lamp it is believed that the invention is applicable to all tungsten halogen lamps of up to 2000 watts. In the case of lower wattage linear lamps (500 watts and less) it is often convenient to include nitrogen gas in the fill to prevent destructive arcing at the end of life. Moreover although a preferred lamp to which the invention is applicable is a tungsten halogen linear incandescent lamp wherein the filament and support/lead wires are generally in line or parallel it is believed the invention is equally applicable to tungsten halogen incandescent lamps wherein the support/lead wires are generally transverse to the filament as in a single ended lamp.

The invention will now be described by way of example only with reference to the accompanying drawings wherein FIG. 1 shows a tungsten halogen linear incandescent lamp according to one aspect of the invention.

FIG. 3 shows a graph of iodoform plotted against bromophosphonitrile according to the invention.

Figure 1:
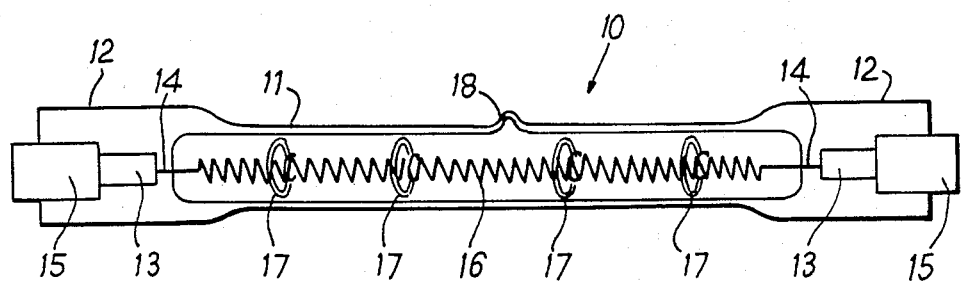

Specific lamps in accordance with the present invention were made up and tested generally as follows. A typical tungsten halogen cycle linear electric incandescent lamp is shown in FIG. 1. This lamp 10 generally comprises a tubular envelope 11 of fused silica hermetically sealed at both ends by pinch seals 12. The pinch seals enclose molybdenum foil members 13 electrically connected on the one hand to lead wires 14 and on the other hand to electric contact members (not shown) which are surrounded by ceramic end caps 15. A coiled tungsten filament 16, connected to the lead wires 14, is situated within the envelope 11 and is supported therein by a number of wire loop members 17 in a well known manner.

A tubulation 18 allows the in-filling of the various gaseous ingredients of the lamp fill as will be later described. A typical lamp as shown will have a length of the order of 254 mm an outside diameter of 12 mm and inside diameter of 10 mm and an internal volume of 8 cc. The envelope will include a fill of a non-reactive gas such as argon to a pressure of between 2 to 3 atmospheres. The lamp is a 1,000 watt lamp.

Figure 2:
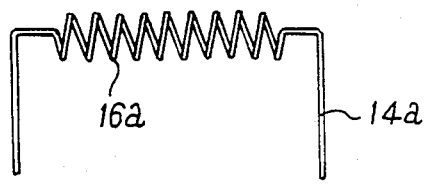
FIG. 2 shows a tungsten halogen incandescent lamp filament according to a further aspect of the invention.

FIG. 2 shows a filament 16a of a tungsten halogen electric incandescent lamp wherein the support and/or lead wires 14a are generally transverse to the longitudinal axis of the filament 16a such as would be the case in a single ended lamp. A lamp 10 generally as shown in FIG. 1 with electrical contacts and with the filament supported and sealed in position within the envelope 11 but with tubulation 18 left open to atmosphere was then dosed by injecting a known amount of iodoform and a known amount of bromophosphonitrile. This was done either by:

(1) (a) injecting a known amount of iodoform dissolved in a solvent such as petroleum ether (60°–80°) by hypodermic syringe into the lamp envelope, followed by injecting a known amount of bromophosphonitrile also dissolved in petroleum ether (60°–80°), or (1) (b) injecting a known amount of bromophosphonitrile plus iodoform dissolved in a suitable quantity of petroleum ether (60°–80°) into the lamp envelope.

For test purposes (1) (a) was found more convenient than (1) (b) but it is believed (1) (b) is more convenient for production purposes.

Thereafter the procedure was as follows:

(2) The solvent was removed by flushing the lamp envelope with nitrogen or argon.

(3) The lamp was pumped to remove all residual gases particularly water and oxygen.

(4) The lamp was filled with argon gas by connecting the lamp to a source of gas supply at a known pressure; isolating the lamp from the supply at the required pressure; surrounding the lamp with liquid nitrogen to draw the argon into the lamp envelope and thereafter closing off the exhaust tubulation 18.

(5) The lamp was then put on life test. When each lamp achieved the required rated 2000 hours plus a further 100 hours it was removed.

The following examples 1–10 relate to a number of lamps which were dosed and tested in the above manner and the results can best be correlated with reference to FIG. 3 which shows results graphed with the lamps identified respectively as points 1 to 10.

EXAMPLE 1

A lamp of the general type described above having an internal volume of 8 cc was dosed with 100 micrograms of bromophosphonitrile plus 500 micrograms iodoform dissolved in 1/70 cc and 1/10 cc of petroleum ether (60°–80°) respectively.

EXAMPLE 2

A lamp of the same general type was dosed with 100 micrograms of bromophosphonitrile plus 400 micrograms of iodoform dissolved in 1/70 cc and 1/10 of petroleum ether (60°–80°) respectively.

EXAMPLE 3

A lamp of the same general type was dosed with 100 micrograms of bromophosphonitrile plus 300 micrograms of iodoform dissolved in 1/70 cc and 1/20 cc of petroleum ether (60°–80°) respectively.

EXAMPLE 4

A lamp of the same general type was dosed with 100 micrograms of bromophosphonitrile plus 200 micrograms of iodoform dissolved in 1/70 cc and 1/20 cc of petroleum ether (60°–80°) respectively.

EXAMPLE 5

A lamp of the same general type was dosed with 100 micrograms bromophosphonitrile plus 100 micrograms of iodoform dissolved in 1/70 cc and 1/40 cc of petroleum ether (60°–80°) respectively.

EXAMPLE 6

A lamp of the same general type was dosed with 75 micrograms bromophosphonitrile plus 200 micrograms of iodoform dissolved in 1/100 cc and 1/20 cc of petroleum ether (60°–80°) respectively.

EXAMPLE 7

A lamp of the same general type was dosed with 75 micrograms bromophosphonitrile plus 100 micrograms of iodoform dissolved in 1/100 cc and 1/40 cc of petroleum ether (60°–80°) respectively.

EXAMPLE 8

A lamp of the same general type was dosed with 150 micrograms of bromophosphonitrile plus 400 micrograms iodoform dissolved in 1/40 cc and 1/10 cc of petroleum ether (60°–80°) respectively.

EXAMPLE 9

A lamp of the same general type was dosed with 200 micrograms of bromophosphonitrile plus 700 micrograms of iodoform dissolved in 1/30 cc and 1/10 cc of petroleum ether (60°–80°) respectively.

EXAMPLE 10

A lamp of the same general type was dosed with 200 micrograms of bromophosphonitrile plus 200 micrograms iodoform dissolved in 1/30 cc and 1/20 cc of petroleum ether (60°–80°) respectively.

All these lamps were burning satisfactorily after 2,000 hours and had an efficacy greater than lamps dosed only with iodoform. The following Table 1 shows that the lamps dosed with the preferred mix of 100 micrograms of bromophosphonitrile and 200 micrograms of iodoform achieved an efficacy comparable with a lamp dosed with bromophosphonitrile only whilst also achieving a life comparable with a lamp dosed with iodoform only.

TABLE 1

| Lamp Micrograms of | Average Life Hours | Efficacy Lumens/Watt |
|---|---|---|
| 100 Bromophosphonitrile | 1100 | 21.4 |
| 100 Bromophosphonitrile 200 Iodoform | 2000 | 21.2 |
| 1000 Iodoform | 2000 | 20.3 |

What we claim is:

1. A tungsten halogen cycle electric incandescent lamp comprising an envelope of light transmitting refractory material, a filament within said envelope, means supporting the filament within the envelope and electric leads to the filament, said lamp further including a non reactive gas filling together with a further fill comprising a mixture of bromophosphonitrile and iodoform wherein said further fill comprises from 6 to 32 micrograms of bromophosphonitrile per cc of the internal volume of the lamp envelope and wherein the ratio of the iodoform to the bromophosphonitrile is from 1:1 to 5:1 by weight.

2. A lamp according to claim 1 containing 12.5 micrograms of bromophosphonitrile per c.c. and wherein the ratio of iodoform to bromophosphonitrile is 2:1 by weight.

3. A a tungsten halogen linear incandescent lamp according to claim 1 wherein the lead and support wires are generally parallel to the filament.

4. A lamp according to claim 1 wherein the lead and support wires are generally transverse to the filament.

5. A tungsten halogen cycle electric incadescent lamp according to claim 1 wherein the non reactive gas filling includes nitrogen.

* * * * *